(No Model.)
W. H. BODFISH.
METALLIC PACKING.
No. 480,943. Patented Aug. 16, 1892.
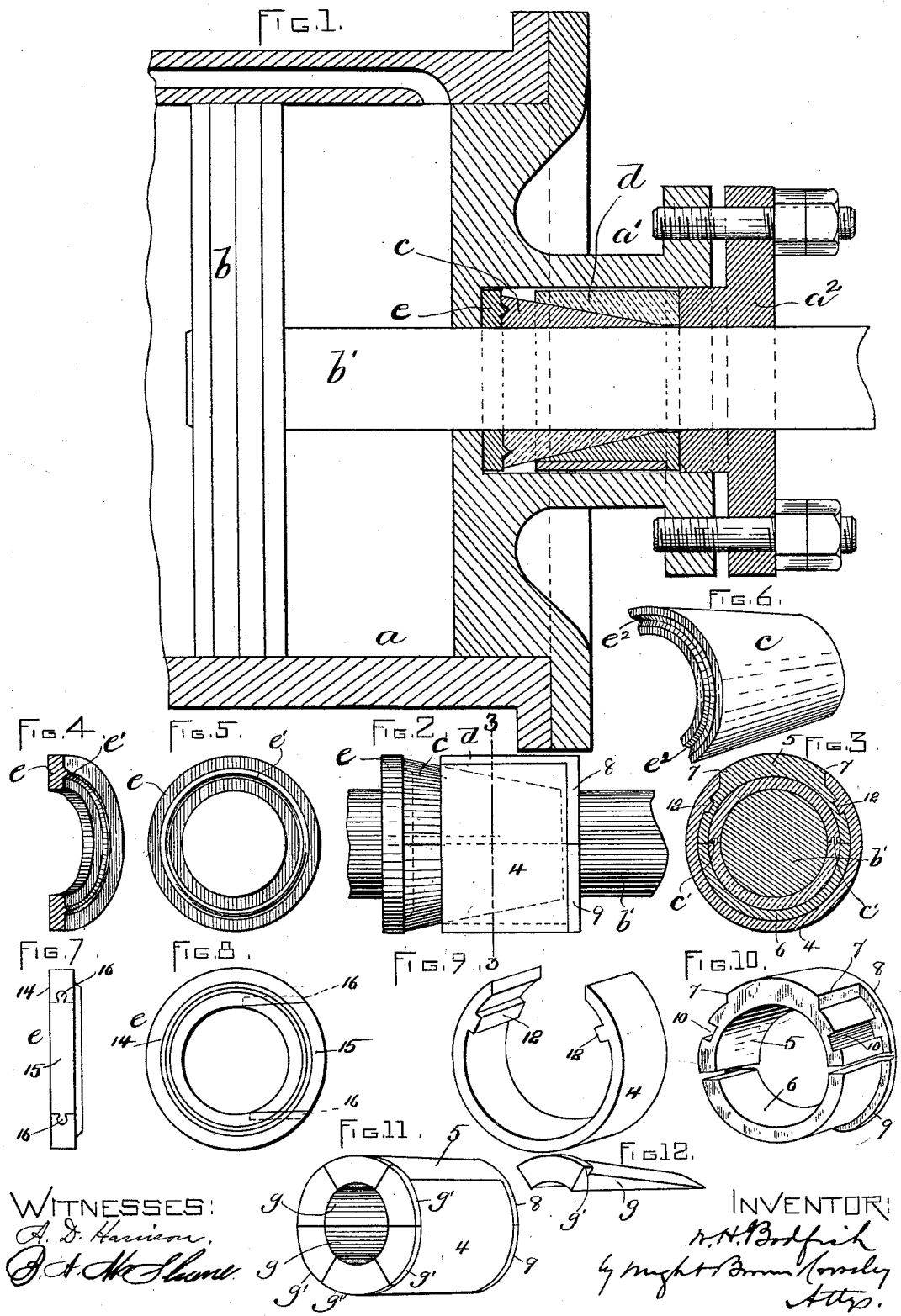

UNITED STATES PATENT OFFICE.

WILLIAM H. BODFISH, OF EVERETT, ASSIGNOR OF ONE-HALF TO ROSWELL CARLETON, OF BOSTON, MASSACHUSETTS.

METALLIC PACKING.

SPECIFICATION forming part of Letters Patent No. 480,943, dated August 16, 1892.

Application filed October 26, 1891. Serial No. 409,870. (No model.)

*To all whom it may concern:*

Be it known that I, WILLIAM H. BODFISH, of Everett, in the county of Middlesex and State of Massachusetts, have invented certain new and useful Improvements in Metallic Packing, of which the following is a specification.

This invention relates to metallic packing for piston-rods; and has for its object to provide a simple and durable packing which can be applied to and removed from the rod without disconnecting the latter from the piston-head or removing it from the stuffing-box.

To this end the invention consists in the improvements which I will now proceed to describe and claim.

In the accompanying drawings, forming part of this specification, Figure 1 represents a sectional view of a portion of a cylinder, the stuffing-box thereon, and the packing embodying my invention, the piston-rod being shown in elevation. Fig. 2 represents a side elevation of a portion of the piston-rod and my improved packing thereon removed from the stuffing-box. Fig. 3 represents a section on line 3 3, Fig. 2. Fig. 4 represents a perspective view of one-half of the ribbed ring, forming part of the packing shown in Figs. 1, 2, and 3. Fig. 5 represents a side view of said ring. Fig. 6 represents a perspective view of one of the beveled or tapered parts of the packing. Fig. 7 represents an edge view, and Fig. 8 a side view of the ribbed ring, made in two separable parts to permit the ring to be applied to the rod by an edgewise movement. Figs. 9 and 10 represent perspective views of other parts of the packing; and Figs. 11 and 12 represent perspective views showing modifications.

The same letters and numerals of reference indicate the same parts in all the figures.

In the drawings, $a$ represents the steam-engine cylinder, $b$ the piston that works therein, and $b'$ the piston-rod.

$a'$ represents a stuffing-box of the usual construction, through which the piston-rod passes, said stuffing-box being formed to contain my improved packing.

My improved packing comprises two general parts—namely, first, a sleeve $c$, composed of Babbitt metal or other suitable compressible material, which is adapted to surround the piston-rod and is formed internally to closely fit said rod, and is externally tapered so that its periphery constitutes a coned frustum; and, secondly, a collar $d$, surrounding and adapted to compress the sleeve $c$, said collar being internally tapered to fit the external taper of the sleeve, so that when moved endwise upon the sleeve, the latter being prevented from moving, the collar will exert a compressive action upon the sleeve and press the latter closely against the periphery of the rod. The sleeve $c$ is made in two or more parts or sections, which are separable from each other, the edges of one section $c'$ having tongues which enter grooves in the corresponding edges of the other section, said tongues and grooves co-operating to form steam-tight joints between the two sections of the sleeve. (See Fig. 3.)

The collar $d$ is composed of the parts or sections 4, 5, and 6. (Shown in Figs. 9 and 10.) The sections 5 and 6 are formed to collectively constitute a ring or band surrounding the sleeve $c$, their inner surfaces being tapered to fit the tapered exterior of said sleeve. The section 5 is cut away or reduced in thickness from its ends part way to its center, the reduced portion terminating in two shoulders 7 7. The section 5 is also provided with flanges 8 8, extending along said reduced portions at one end of the section, the flanges being continuations of the shoulders 7 7. The section 6 is reduced along its entire external surface like the ends of the section 5 and has a flange 9, constituting a continuation of the flanges 8 8, the end of the flange 9 meeting the ends of the flanges 8 8 when the sections 5 and 6 are in position upon the sleeve $c$. In the reduced portions of the section 5 are formed slots 10 10. The section 4 is formed to fit the reduced portions of the sections 5 and 6, and to bridge over the joints between said sections, its form being such that when applied to the sections 5 6 its outer surface will be flush with the shoulders 7 7 and with the flanges 8 9. The section 4 is provided with tongues 12 12, formed to enter the slots 10 10 in the section 5. The described construction of the collar $d$ enables it to be placed upon the piston-rod by the assemblage of its parts thereon, the sections 5 6 being first placed upon the rod by lateral movements in opposite directions, after which the section 4 is moved upon the rod, the ends of section 4 being separated by a space of sufficient width to receive the rod between them, after which the section 4 is moved lengthwise of the rod until its tongues 12 enter the slots 10. The engagement of the tongues 12 with the slots of the section 5 locks the parts or sections of the collar $d$ firmly together and makes it a practically-continuous collar, which is not liable to be separated by accident.

$e$ represents a ring or washer, which is interposed between the larger end of the collar $d$ and the inner end of the packing-receiving cavity of the stuffing-box. The said ring has upon one side an annular V-shaped rib $e'$, which enters a corresponding groove $e^2$, Fig. 6, in the sections of the sleeve $c$. The object of said rib and groove is to increase the tightness of the joint at the larger end of the sleeve $c$, and by forming the rib upon a removable washer, as shown, I am enabled to renew it from time to time, which could not be conveniently done if the rib were formed directly upon the piston-head.

It will be seen that the packing, consisting of the compressible tapered sleeve $c$ and the practically rigid compressing-collar $d$, movable lengthwise upon the sleeve, operates to form a tight joint around the piston-rod without bearing upon or coming in contact with the surrounding wall of the packing-receiving cavity in the stuffing-box, the outer surface of the collar $d$ being separated from the wall of the stuffing-box by an annular space, as indicated in Fig. 1. Hence the packing can be adjusted or contracted at any time to compensate for the wear simply by the endwise movement of the collar $d$ upon the sleeve $c$, this movement being effected by the adjustment of the gland $a^2$ of the stuffing-box. The collar $d$ is made of such length that there is room between its inner end and the inner end of the packing-receiving cavity to permit a considerable inward movement of the collar before the latter comes in contact with the inner end of the cavity. Hence the collar can be adjusted from time to time to compensate for wear of the inner surface of the sleeve until the sleeve has been worn so thin as to be useless.

In Fig. 7 and 8 I show the ring $e$ as made in two separable parts or sections 14 15, the section 15 being of such length that the opening formed by its removal is wider than the piston-rod, so that the ring $e$ may be applied to the rod by the assemblage of its parts upon the rod. The ends of the section 15 have tongues 16 16, which enter corresponding grooves in the ends of the section 14 and facilitate the formation of a steam-tight joint.

In Figs. 11 and 12 I show a modification in which I substitute for the sleeve $c$, made in two parts or sections, as above described, and for the ring $e$, arranged at one end of said sleeve, a series of narrower sections $g$, preferably six in number, although the number may be increased or diminished, said sections collectively forming a continuous ring adapted to surround the piston-rod, their outer surfaces being tapered and their inner surfaces formed to closely fit the rod, so that they constitute an equivalent of the sleeve $c$. Upon the larger ends of the sections $g$ I form outwardly-projecting flanges $g'$, which bear upon the inner end of the packing-receiving cavity in the stuffing-box. The collar $d$, used with the sections $g$, may be of the construction above described.

The sections of the collar $d$ are preferably made of a harder and more rigid metal than the sleeve, brass being the preferred metal. It is important that the collar $d$ be so rigid as to be incapable of yielding to or being expanded by the outward pressure exerted on its interior by the compressive force applied by the collar to the sleeve. The above-described sectional construction of the collar not only gives the desired rigidity, but also permits the application and removal of the collar without disturbing or displacing the piston-rod.

In using the words "compressible metal" in the following claims I mean to designate any metal or alloy having the usual characteristics of Babbitt metal and other materials which are employed for bearings.

I claim—

1. The combination, in a metallic packing, of an externally-tapered compressible metal sleeve formed internally to fit a piston-rod, a collar of rigid construction having an internally-tapered surface fitting the exterior of the sleeve, and a ring or gasket having an annular rib formed to bear against the larger end of the sleeve, said parts being formed for insertion in the cavity of a stuffing-box, as set forth.

2. A metallic packing composed of an externally-tapered compressible metal sleeve made in separable longitudinal sections having tongue-and-grooved joints, the larger ends of said sections being provided with grooves, a ring adapted to bear against the inner end of the cavity of the stuffing-box and provided with an annular rib adapted to enter the grooves in the sleeve-sections, and a collar of rigid construction internally tapered to fit the exterior of the sleeve and arranged to bear against the gland of the stuffing-box, as set forth.

3. The collar composed of two separable sections collectively forming an internally-tapered ring adapted to surround an externally-tapered sleeve, and a binding or locking section formed to unite said sections and cover the joints thereof, said locking-section being fitted in recesses formed for it in the other sections, the whole forming a rigid or unyielding divisible collar presenting a cylindrical exterior combined with an externally-tapered sleeve formed to fit the tapered interior of the collar, said sleeve being composed of separable sections, as set forth.

4. The sleeve-compressing collar composed of the semicircular section 5, externally reduced at its ends to form shoulders 7 7 and flanges 8 8, the reduced portions having slots 10 10, the semicircular section 6, externally reduced from end to end and having a flange 9, constituting a continuation of the flanges 8 8, and the segmental section 4, formed to fit the reduced portions of the sections 5 6, and provided with tongues 12 12, formed to engage the slots 10 10, the ends of said segmental section being separated by a space wider than the diameter of the piston-rod, as set forth.

In testimony whereof I have signed my name to this specification, in the presence of two subscribing witnesses, this 22d day of October, A. D. 1891.

WILLIAM H. BODFISH.

Witnesses:
C. F. BROWN,
A. D. HARRISON.